US008336526B1

(12) United States Patent
Martin et al.

(10) Patent No.: US 8,336,526 B1
(45) Date of Patent: Dec. 25, 2012

(54) VAPOR PURGE SYSTEM INTEGRITY DIAGNOSIS FOR A HYBRID VEHICLE

(75) Inventors: Douglas Raymond Martin, Canton, MI (US); Ann Irene Sipes, Milan, MI (US); Robert Roy Jentz, Westland, MI (US); Aed Mohammad Dudar, Canton, MI (US); Mark W. Peters, Wolverine Lake, MI (US); Guopeng Hu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/356,823

(22) Filed: Jan. 24, 2012

Related U.S. Application Data

(62) Division of application No. 13/355,793, filed on Jan. 23, 2012.

(51) Int. Cl.
 *F02M 33/02* (2006.01)
 *F02M 25/08* (2006.01)
(52) U.S. Cl. ............... 123/518; 123/520; 73/114.39
(58) Field of Classification Search .......... 123/516, 123/518–520; 73/114.39
 See application file for complete search history.

(56) References Cited

U.S. PATENT DOCUMENTS

| 6,970,775 | B2 | 11/2005 | Lederle et al. | |
|---|---|---|---|---|
| 7,506,639 | B2 | 3/2009 | Saito | |
| 7,562,559 | B2 | 7/2009 | Chung et al. | |
| 7,584,651 | B2 | 9/2009 | Streib et al. | |
| 7,762,241 | B2 | 7/2010 | Childress et al. | |
| 8,019,525 | B2 * | 9/2011 | DeBastos et al. | 701/102 |
| 8,074,627 | B2 * | 12/2011 | Siddiqui | 123/520 |
| 2003/0172912 | A1 | 9/2003 | Kanai et al. | |
| 2006/0065253 | A1 | 3/2006 | Reddy | |
| 2006/0174698 | A1 | 8/2006 | Chung et al. | |
| 2007/0079650 | A1 | 4/2007 | Streib et al. | |
| 2008/0034843 | A1 | 2/2008 | Streib et al. | |
| 2011/0139130 | A1 * | 6/2011 | Siddiqui | 123/520 |
| 2011/0166765 | A1 | 7/2011 | DeBastos et al. | |
| 2011/0290000 | A1 * | 12/2011 | DeBastos et al. | 73/23.31 |
| 2011/0315127 | A1 | 12/2011 | Jackson et al. | |
| 2012/0055452 | A1 * | 3/2012 | DeBastos et al. | 123/521 |

OTHER PUBLICATIONS http://www.landroversonly.com/forums/f40/evaportive-system-test-not-running-31890/, "Evaportive System Test Not Running", Jun. 14, 2010, 4 pages.
"Fuel and EVAP System", Section 3, Toyota Hybrid System Diagnosis—Course 072, 2004, 18 pages.

* cited by examiner

*Primary Examiner* — Thomas Moulis
(74) *Attorney, Agent, or Firm* — Brooks Kushman P.C.; Julia Voutyras (57) ABSTRACT

A method for testing a vapor purge system (VPS), and the vehicle having the VPS, including a controller for measuring a VPS pressure, closing a first valve coupling a VPS carbon canister and the environment, decreasing VPS pressure if it is greater than a threshold, and monitoring VPS pressure for a time period when the engine is at rest and the vehicle is operating. The pressure is decreased by opening a second valve coupling the fuel tank and the engine while the engine is running, and closing the second valve when the pressure is below the threshold. Another method for testing a VPS includes closing a first valve, closing a second valve, measuring the VPS pressure to provide a reference pressure with an associated profile, and monitoring VPS pressure compared to the profile for a time period.

20 Claims, 6 Drawing Sheets

VAPOR PURGE SYSTEM INTEGRITY DIAGNOSIS FOR A HYBRID VEHICLE

CROSS-REFERENCE TO RELATED APPLICATIONS

This application is a division of U.S. application Ser. No. 13/355,793 filed Jan. 23, 2012, the disclosure of which is incorporated in its entirety by reference herein.

TECHNICAL FIELD

Various embodiments relate to testing for and diagnosing a leak in a vapor purge system coupled to an internal combustion engine in a hybrid electric vehicle (HEV).

BACKGROUND

When an automotive fuel tank is filled, air laden with fuel vapor is displaced by fuel. The fuel tank is connected by a vent to the atmosphere to provide pressure equalization both during fueling, and as fuel is used by the engine. A carbon canister is placed between the fuel tank and the atmosphere to remove and temporarily store fuel vapors from the air before being exhausted. The fuel vapors are subsequently delivered to the engine for combustion during a periodic carbon canister purge operation. The emission system components, including the fuel vapor storage system, are periodically tested onboard the vehicle to ensure proper operation and to detect any leaks that may allow fuel vapors to enter the atmosphere. The vapor purge system may be tested for leaks by creating a vacuum or reducing pressure relative to atmosphere and observing the change in pressure over time. If the system pressure or vacuum remains constant or slowly changes, no leak is indicated. However, a rapid change in system pressure toward atmospheric pressure indicates a leak.

In a conventional vehicle, the vacuum in the intake manifold during an engine idle condition may be applied to the vapor purge system to determine if leaks are present using a system integrity test. However, for an engine system disposed in an HEV, engine idle is generally avoided because it is an inefficient operating condition. Of course, the engine in an HEV may be commanded to operate at idle to facilitate a system integrity test of the purge system; however, this consumes additional fuel. Alternatively, the system integrity test may be conducted during a steady-state cruise condition of the HEV with the engine running; however, the system integrity test may take as long as three minutes. During this time the test may have to be aborted due to a changing engine condition or a changing vehicle path causing fuel in the tank to slosh and release a large amount of vapors, thereby causing a pressure change and falsely indicating a leak. In another alternative, a vacuum pump is provided; however, this requires an additional piece of hardware in the HEV and is costly.

SUMMARY

In an embodiment, a method to test a vapor purge system (VPS) for an internal combustion engine in a hybrid vehicle is provided. A pressure in the VPS is measured. A first valve coupling a carbon canister of the VPS and the ambient environment is closed. The pressure in the VPS is decreased if the pressure is greater than a threshold by opening a second valve coupling the fuel tank and the engine while the engine is running, and closing the second valve when the pressure is less than the threshold. The pressure in the VPS is monitored for a predetermined time period to test for a leak when the engine is at rest and the vehicle is operating.

In another embodiment, a hybrid electric vehicle (HEV) is provided with an engine, an electric machine, a controller, and a vapor purge system (VPS) having a pressure transducer and a carbon canister coupled to the atmosphere via a first valve and coupled to the engine via a second valve. The controller is configured to (i) close the first valve, (ii) close the second valve when the pressure in the VPS is less than a predetermined threshold value, and (iii) monitor the pressure transducer to monitor pressure in the VPS while the vehicle is operating and the engine is at rest.

In yet another embodiment, a method to test a vapor purge system (VPS) for an internal combustion engine is provided. A first valve coupled between a carbon canister of the VPS and the ambient environment is closed. A second valve coupled between the carbon canister and the engine is closed. The pressure in the VPS is measured to provide a reference pressure value. The reference value has an associated threshold profile that varies with time. The pressure in the VPS is monitored and compared to the associated threshold profile for a predetermined time period.

Various embodiments according to the present disclosure have associated advantages. A fueled operating engine may be used to provide a vacuum source for the VPS while the vehicle is operating. Low pressure provided by the intake manifold may be stored in the fuel tank in preparation for a system integrity test. The use of the engine intake manifold as a source for low pressure or vacuum eliminates the need for a vacuum pump for testing the VPS, thereby reducing the number or parts, cost, and complexity of the system.

Performing the system integrity test using stored low pressure in the fuel tank while the vehicle is operating and the engine is not operating provides additional time to purge the carbon canister during engine operation, since that time is not being used for the testing. In a hybrid vehicle, opportunities for purging the canister are limited compared to a conventional vehicle because the engine may not be operated continuously.

Running multiple system integrity tests during vehicle operation increases the quality of the measurement and the statistical certainty of the outcome of the system integrity test. The use of a percent threshold to determine a leak allows for greater variability in the starting pressure within the VPS for the test, since the low pressure or vacuum provided by the intake manifold may not be a constant value.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
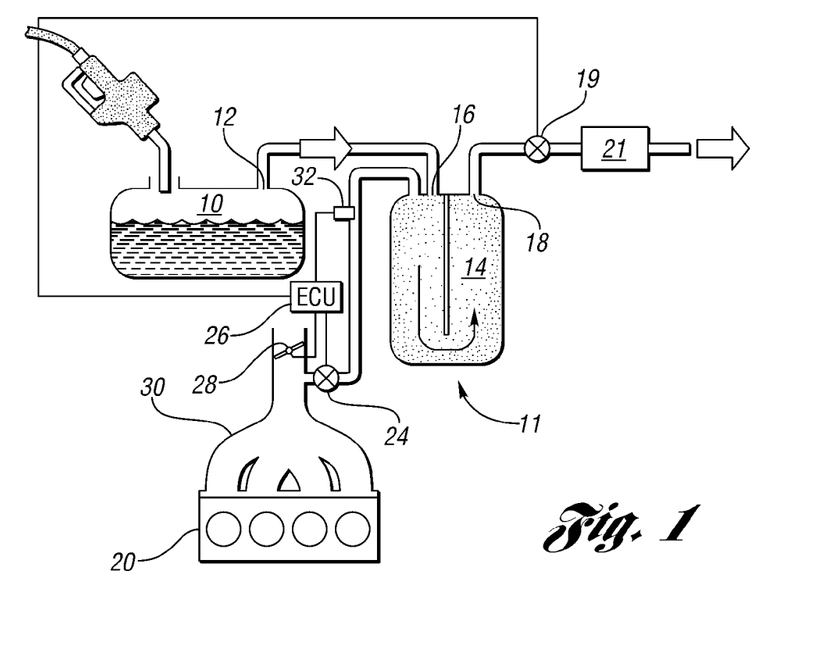
FIGS. 1 and 2 are schematic drawings of a vapor purge system (VPS) illustrating a vapor collection mode and a purge mode, respectively.

A vapor purge system (VPS) 11 is shown in FIG. 1 during a vapor recovery mode. The fuel tank 10 has a fuel vent 12 connected to a carbon canister 14 via recovery port 16 to prevent fuel vapors from entering the atmosphere. The carbon canister 14 is filled with activated carbon to absorb fuel vapors. As gases containing fuel vapor pass through the bed of carbon, the fuel vapor is absorbed by the carbon pellets. Carbon canister 14 also has a vent port 18 communicating to the atmosphere. When such gases exit carbon canister 14 through vent port 18, all, or substantially all, of the fuel vapor displaced from the fuel tank 10 is absorbed by contact with the carbon pellets.

The VPS 11 may include the fuel tank 10, canister 14, canister 15 (as discussed below with reference to FIG. 3), and interconnecting lines leading to the engine intake manifold 30 and outside atmosphere.

The vent port 18 is coupled to an onboard diagnostic (OBD) valve 19 and to a filter 21. The OBD valve 19 may be an on-off valve. In the vapor recovery mode, the OBD valve 19 is open and the purge valve 24 is closed. The vapor recovery mode may be used during a fueling operation, as shown in as shown in FIG. 1.

Figure 2:
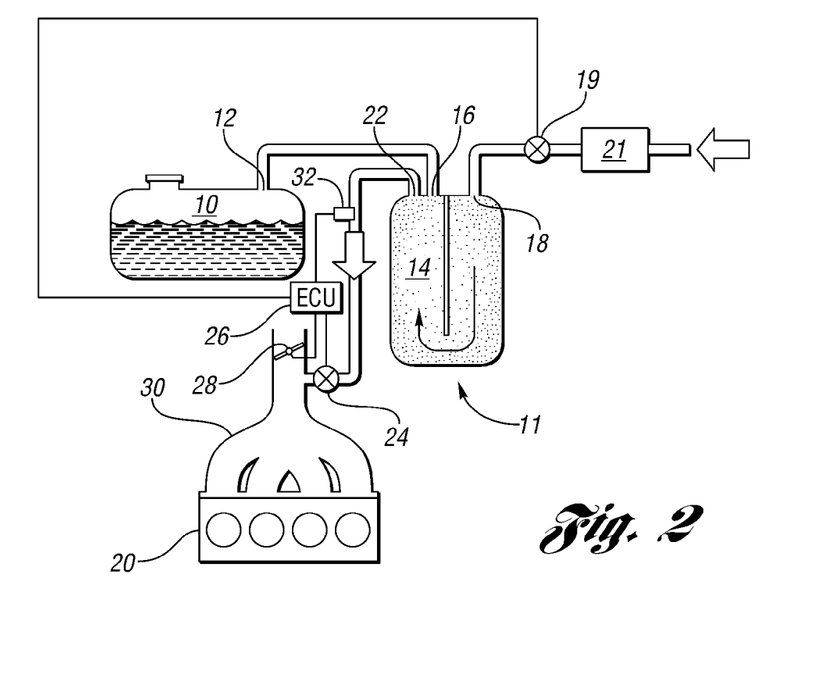

Alternatively, vapor recovery may also occur when the vehicle is parked with a cap covering fuel tank 10. Daily (diurnal) temperature variations cause lower molecular weight components of the fuel to vaporize during the heat of the day. These fuel vapors are absorbed in canister 14 as the gases expand and flow out through vent 18. At night, gases in the system contract due to a temperature drop and pull in fresh air through port 18, as shown in FIG. 2.

Activated carbon has a limited ability to store fuel and, therefore, the absorbed fuel vapor is periodically purged from the activated carbon so that it can absorb fuel vapor displaced from fuel tank 10. As shown in FIG. 2, purging is accomplished by pulling fresh air from the atmosphere through the carbon pellets within the carbon canister 14, and inducting that air, which contains desorbed fuel, through purge port 22 into an operating internal combustion engine 20. The fuel vapors that are desorbed into the incoming air are combusted in engine 20 to primarily form carbon dioxide and water which is exhausted from engine 20 and through a catalytic converter.

During purge, fresh air is drawn in through the filter 21, opened OBD valve 19, and vent port 18 into the canister 14. A purge valve 24 is located upstream of engine 20 and is controlled by electronic control unit (ECU) 26, or controller, to control the flow of gases through carbon canister 14. The gases introduced through purge valve 24 are mixed with air entering an intake manifold 30 through throttle valve 28, which is also controlled by the ECU 26.

The VPS 11 may be diagnosed for leaks by placing the VPS in a low pressure state, or under a vacuum, and observing the change in pressure over time. There are requirements for emission system components to be periodically be tested onboard the vehicle.

Figure 3:
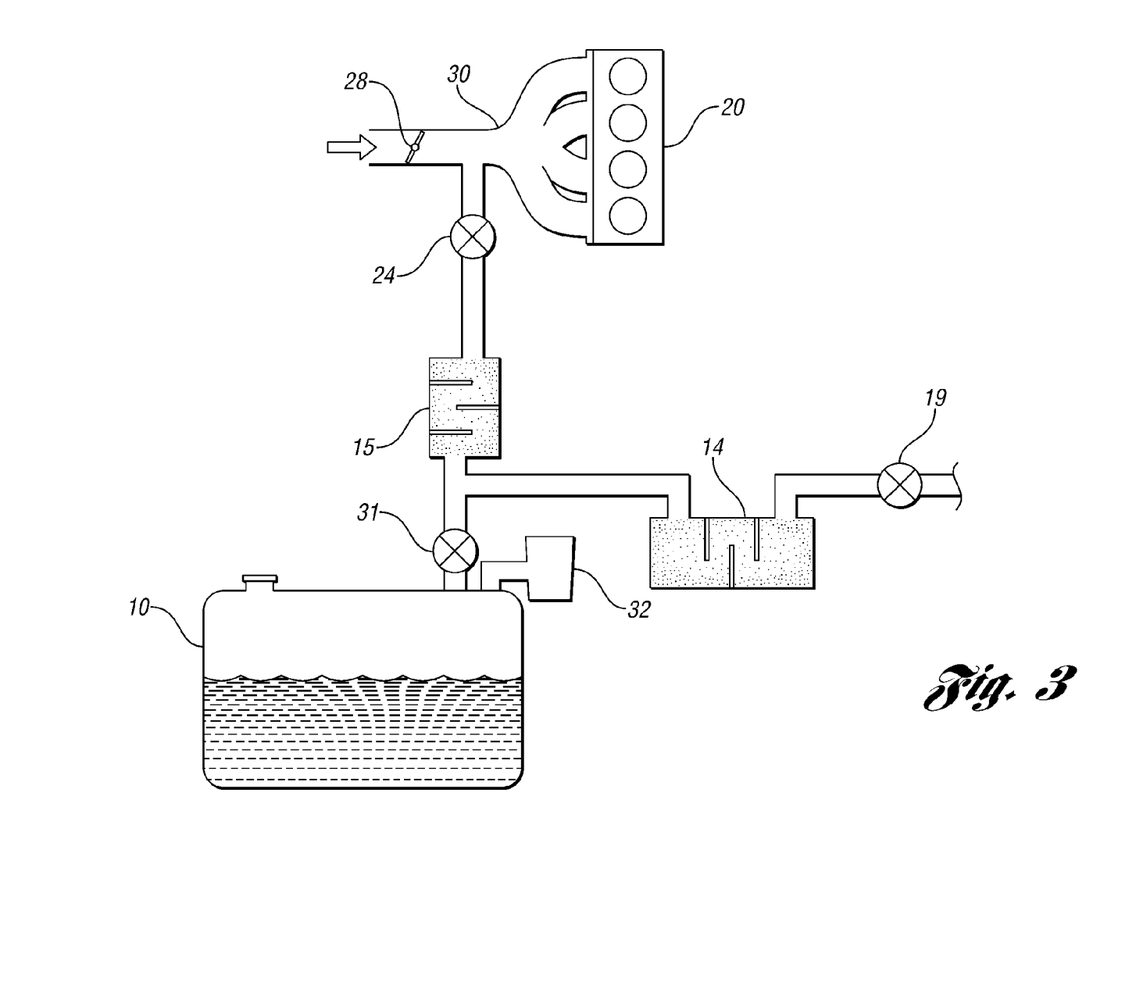
FIG. 3 is a schematic drawing of a VPS for use with an HEV according to an embodiment.

Another embodiment of a VPS is in FIG. 3, and the same reference numerals are used for the same or similar components as in FIGS. 1-2. To pull a vacuum or generate sub-atmospheric pressure within the VPS, before a system integrity test is performed, the OBD valve 19 is closed and purge valve 24 is opened under a condition when the intake 30 is at a low pressure state, such that the pressure in the VPS 11 is less than atmospheric pressure.

A carbon canister 15 is also in the VPS 11. The canister 15 is filled with activated carbon to absorb fuel vapors. The canister 15 absorbs fuel vapors as gases from the VPS 11 flow through the canister 15 and to the engine 20 that is being motored in an unfueled state as described below.

The OBD valve 19 and the purge valve 24 are closed during a VPS 11 test to isolate the system. The fuel tank isolation valve (FTIV) 31 is opened and the sensor 32 signal is monitored to validate the integrity of the system. If the low pressure state, or vacuum, holds within a specified tolerance, the VPS 11 meets the specified system integrity requirements, and passes the integrity or leak test. If the vacuum drops rapidly, a leak is detected and a diagnostic code is set or stored temporarily or permanently in the controller. The pressure or transducer sensor 32 may be replaced with a vacuum sensor where the vacuum in the system would decrease in the presence of a leak.

In one example, the fuel tank isolation valve 31 is a shutoff valve having on/off positions, and the purge valve 24 and the canister valve 19 are range valves. Alternatively, all valves 19, 24, 31 may have a range of flow control or be on/off valves.

Figure 4:
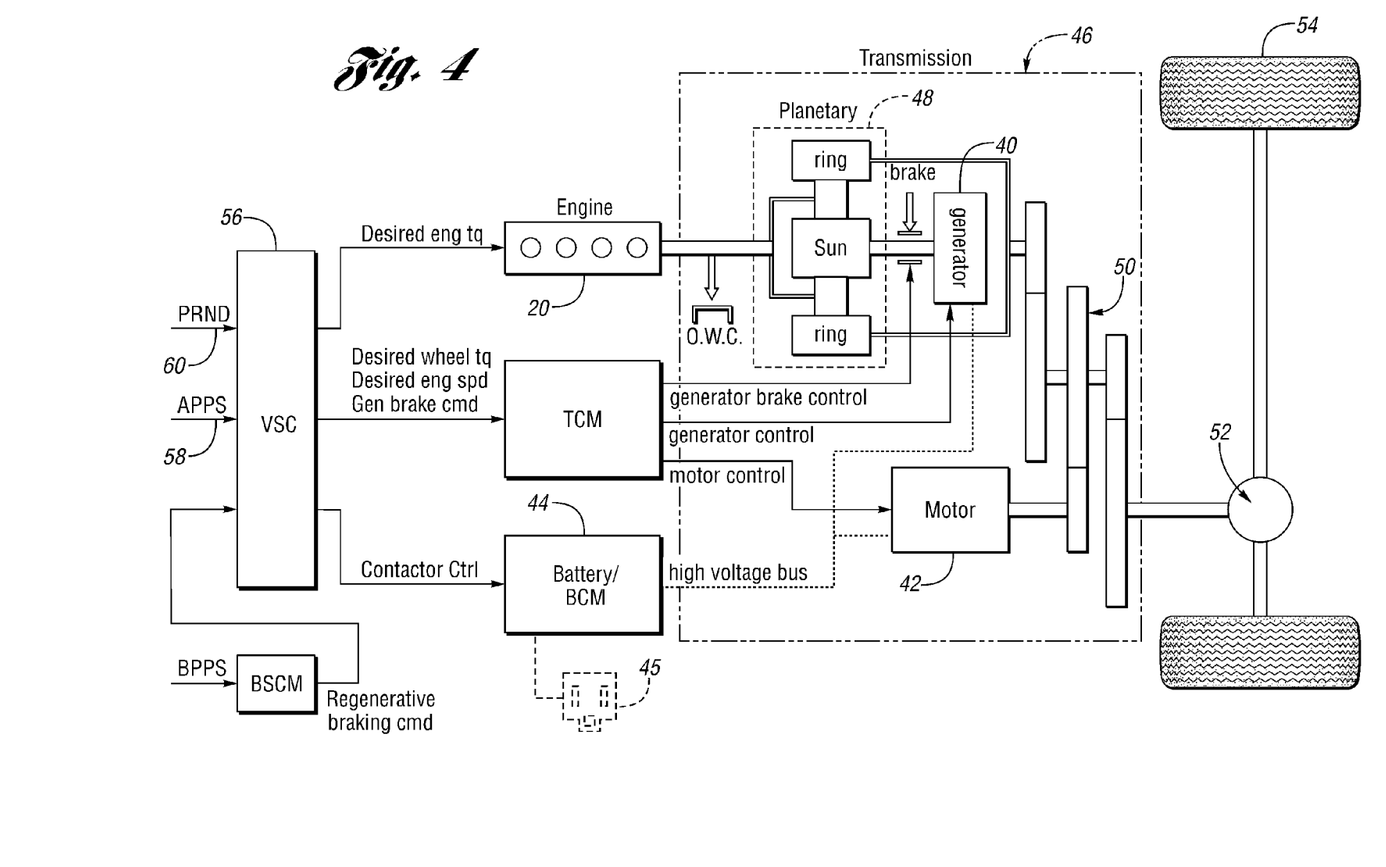
FIG. 4 is a schematic drawing of an embodiment of an HEV for use with the VPS according to the present disclosure.

In FIG. 4, an embodiment of a hybrid electric vehicle (HEV) is shown that may be used with the VPS 11 of the present disclosure. Of course, FIG. 4 represents only one type of HEV architecture, and is not intended to be limiting. The present disclosure may be applied to any suitable HEV. Furthermore, the present disclosure may be applied to any conventional vehicle that includes a start motor or other device for rotating the crankshaft when the engine is not operating. As generally understood by those of ordinary skill in the art and as used herein, motoring the engine refers to turning, driving, or rotating the engine without fueling combustion using some device other than under its own power. Depending on the particular application and implementation, motoring the engine may optionally include controlling valve timing to provide compression braking or manage pumping losses, for example. Most conventional vehicles operate the engine for a sufficient time to periodically perform a system integrity test and purging cycle. However, there may be specific conventional vehicles that benefit from additional opportunities to perform system integrity tests of the VPS 11, such as alternative fuel vehicles using particularly volatile fuels and stop-start vehicles, for example.

Engine 20 is a primary power source in the HEV configuration of FIG. 4. A secondary power source is a combination of a generator 40, an electric motor 42, and a battery and battery control module 44. The components of the combination are electrically coupled by an electrical high voltage bus. In some embodiments, the battery 44 is additionally rechargeable in a plug-in hybrid electric vehicle (PHEV) configuration using a receptacle 45 connected to the battery 44, possibly through a battery charger/converter unit. The receptacle 45 may be connected to the power grid or other outside electrical power source to charge the battery 44.

The powertrain includes a transmission 46, which comprises a planetary gear unit 48, the generator 40 and the motor 42, as well as torque transfer counter shaft gearing 50. The planetary gear unit 48 comprises a ring gear, a sun gear, a planetary carrier and planet gears rotatably supported on the planetary carrier for engagement with the ring gear and the sun gear. A power output gear element of the gearing 50, is drivably connected to a differential-and-axle assembly 52, which distributes power to vehicle traction wheels 54.

An overall controller for the operating modes of the powertrain may be implemented by a vehicle system controller (VSC) 56, electronic control unit (ECU), or controller, that receives various inputs including driver inputs at 58 and 60. The input at 58 is an accelerator pedal position sensor signal (APPS) and the input at 60 is driver selection for "park," "reverse," "neutral" or "drive range" (PRND). The VSC 56 may be integrated with the controller 26 of FIGS. 1-3, or alternatively, the VSC 56 and controller 26 may be implemented by separate modules in communication with one another.

Figure 5:
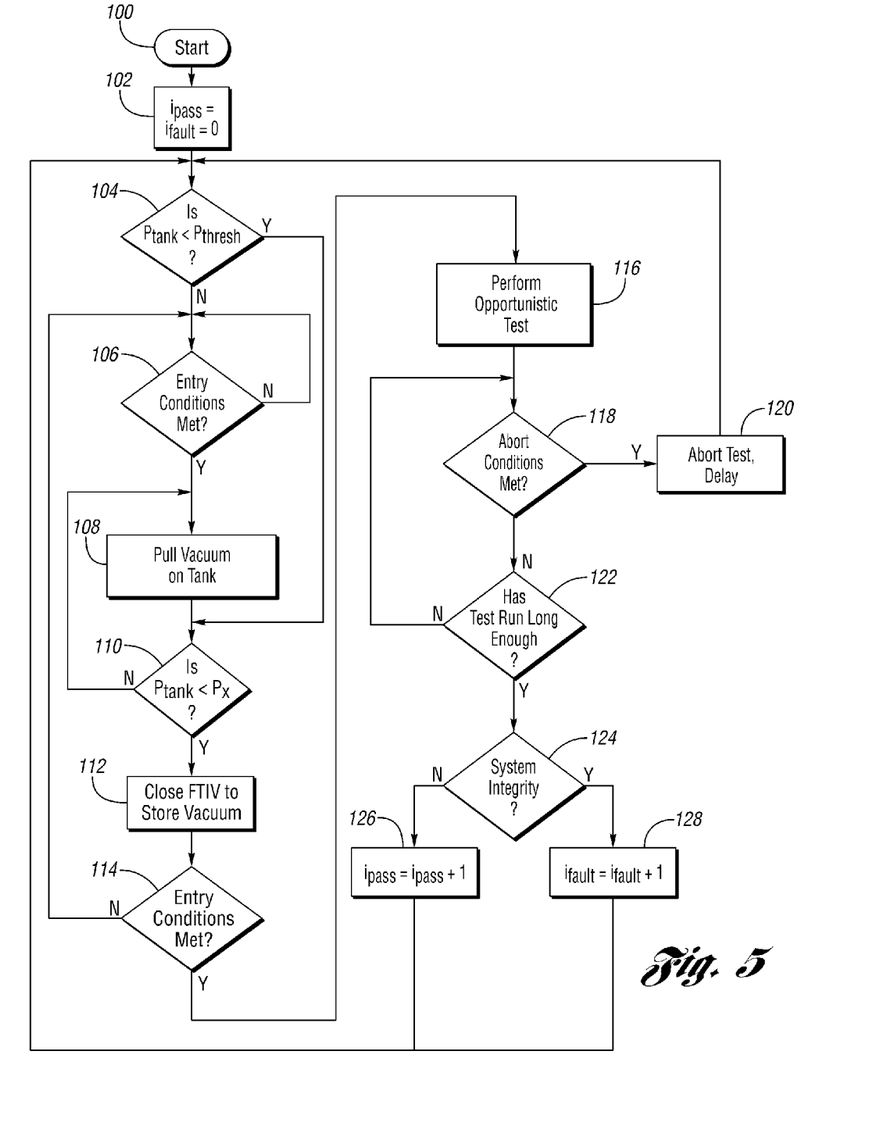
FIG. 5 is a flowchart illustrating an algorithm for a test of the VPS according to the disclosure.

A flow chart illustrating an embodiment of an opportunistic system integrity test starts at 100 in FIG. 5. The controller 26 performs an opportunistic test of the VPS 11 while the vehicle is operating when an opportunity to perform the test arises. The controller 26 resets a counter at 102 at vehicle start up. The controller 26 is in communication with a pressure sensor 32 in the VPS 11 during vehicle operation. The VPS 11 may include the fuel tank 10, the carbon canister 14, and the plumbing interconnecting the fuel tank 10, canisters 14, and the engine 20. During vehicle operation, the canister valve 19 and the purge valve 24 are typically open, while the FTIV 31 may be open or closed.

The controller 26 monitors the pressure sensor 32 or transducer to determine if the pressure in the VPS 11 is less than a threshold pressure at 104. This corresponds to a vacuum in the VPS 11 being greater than a threshold vacuum. The disclosure describes the algorithms and various embodiments in terms of the pressure in the VPS 11. Of course, the controller 26 may also be measuring vacuum using a vacuum sensor and comparing the vacuum levels in the VPS 11 to various vacuum thresholds. In general, a pressure being less than a threshold pressure corresponds to a vacuum being higher than a vacuum threshold. The use of either pressure or vacuum measurements in conjunction with corresponding pressure or vacuum thresholds is contemplated for use with various embodiments of the disclosure.

If the pressure is not less than (i.e. greater than or equal to) the threshold pressure, the controller 26 proceeds to an entry condition check at 106 in preparation for pulling additional vacuum or reducing the pressure in the VPS 11 to bring the pressure below the threshold pressure. Entry conditions at 106 may include, but are not limited to, the engine operating, the engine manifold pressure being less than a threshold pressure, the canister fill fraction being less than a calibratable value such that it is nearly empty, and the catalyst temperature in the catalytic converter being above a specified temperature.

If the entry conditions at 106 are met, the pressure in the VPS 11 may be reduced below its threshold value using the low pressure state in the intake manifold 30. At this point the canister valve 19 is closed. The controller 26 commands the purge valve 24 to an open position to pull vacuum on the VPS 11 at 108 to reduce the pressure. The purge rate is set to a target flowrate. The controller 26 also checks if the FTIV 31 in an open position, and if the FTIV 31 is closed, commands the FTIV to an open position such that a vacuum is also drawn on the fuel tank 10. The FTIV may be left open to avoid impacting purge of the canister if the canister is not near empty.

The controller 26 continues to monitor the pressure in the VPS 11 and when the pressure becomes less than the threshold pressure at 110, the controller 26 commands the FTIV 31 to a closed position to store the low pressure state, or vacuum, in the fuel tank 10. The controller 26 may also command the purge valve 24 to a different position, and the canister valve 19 to an open position, as required to continue normal cleaning of vapors from the canister 14. Alternatively, when high purge flow cause a vacuum state to occur in the VPS 11 without closing the canister valve 19, the controller 26 may open the FTIV 31 when tank vacuum is low, and then close the FTIV 31 when sufficient tank vacuum exists. This allows the canister clean-out to occur without interruption.

The controller 26 opportunistically uses the engine when it is operating to pull vacuum on or provide low pressure to the VPS 11, and then traps the low pressure or vacuum in the fuel tank 10 to conduct a system integrity test of the VPS 11 when a later opportunity for performing the test arises without reducing cleaning time of the vapor canister 14. Reducing the pressure in the fuel tank 10 while the engine 20 is operating due to vehicle or driver demand reduces additional fueled engine operating time to lower pressure in the fuel tank 10 in preparation for a system integrity test, and therefore improves fuel economy, reduces emissions, and minimizes noise, vibration, and harshness (NVH). Vapor generation caused by a low pressure state in the VPS 11 may degrade a vacuum state in the VPS 11, however, the vapor generation and associated pressure change is typically small such that it does not affect the test.

When the pressure is less than the threshold pressure at 104, the VPS 11 may be tested for system integrity at an appropriate time during vehicle operation. The controller 26 proceeds to entry conditions for the opportunistic test at 114. The entry conditions for the opportunistic test may include, but are not limited to, an engine off condition, the canister fill fraction being less than a calibratable value such that it is nearly empty, the pressure in the fuel tank being less than a threshold value, and the vehicle speed being less than a threshold speed for a predetermined time. Additional conditions may include: the ambient temperature being within a specified temperature range, the fuel tank pressure being above a minimum level, the fuel level in the fuel tank being within a specified range, the ambient pressure being above a specified pressure, and that a sensor or valve actuator does not have a diagnostic code that may prevent a test.

When the entry conditions at 114 are met, the controller 26 proceeds to performing the opportunistic test of the VPS 11 at 116. The controller 26 commands the purge valve 24 closed and the canister valve 19 closed. The controller 26 then commands the FTIV 31 open, if it is not already in an open position. The VPS 11 is then in a low pressure or vacuum state compared to the atmospheric pressure and is isolated for testing if a leak is present in the VPS 11, the low pressure state in the VPS 11 will equilibrate over time with the atmospheric conditions.

While the test is running, the controller 26 checks for test abort conditions at 118. Abort conditions include, but are not limited to, a fuel level sensor indicating fuel sloshing in the tank that may indicate refueling is occurring, and/or the pressure in the fuel tank being less than a minimum allowable pressure value. If an abort condition is present at 118, the controller 26 aborts or delays the test at 120 and the controller 26 returns to 104.

If an abort condition is not present, the controller 26 continues to monitor the pressure in the VPS 11 for a predetermined time period. Once the predetermined time period is reached at 122, the controller 26 then determines if the VPS 11 has system integrity or leaked at 124. The test may continue for its predetermined time period if the vehicle enters a shutdown condition after the test has been initiated. The test criteria to determine whether a diagnostic code is stored is described in greater detail with respect to FIG. 7.

The controller 26 has a pass counter 126 and a fault counter 128. If the system integrity test passed, indicating system integrity for that test while the vehicle was operating, the controller 26 adds a pass to the pass counter 126. If the system integrity test does not pass, indicating a system fault for that test while the vehicle was operating, the controller 26 adds a fault to the fault counter 128.

After updating the counters 126, 128, the controller 26 resets back to block 104 and monitors the pressure in the system 11 compared to the threshold pressure, and prepares to run another opportunistic test at the next opportunity. The pass counter 126 and fault counter 128 keep a running tally or count of the number of passed tests and the number of faulted tests that were completed while the vehicle was operating since start up.

Figure 6:
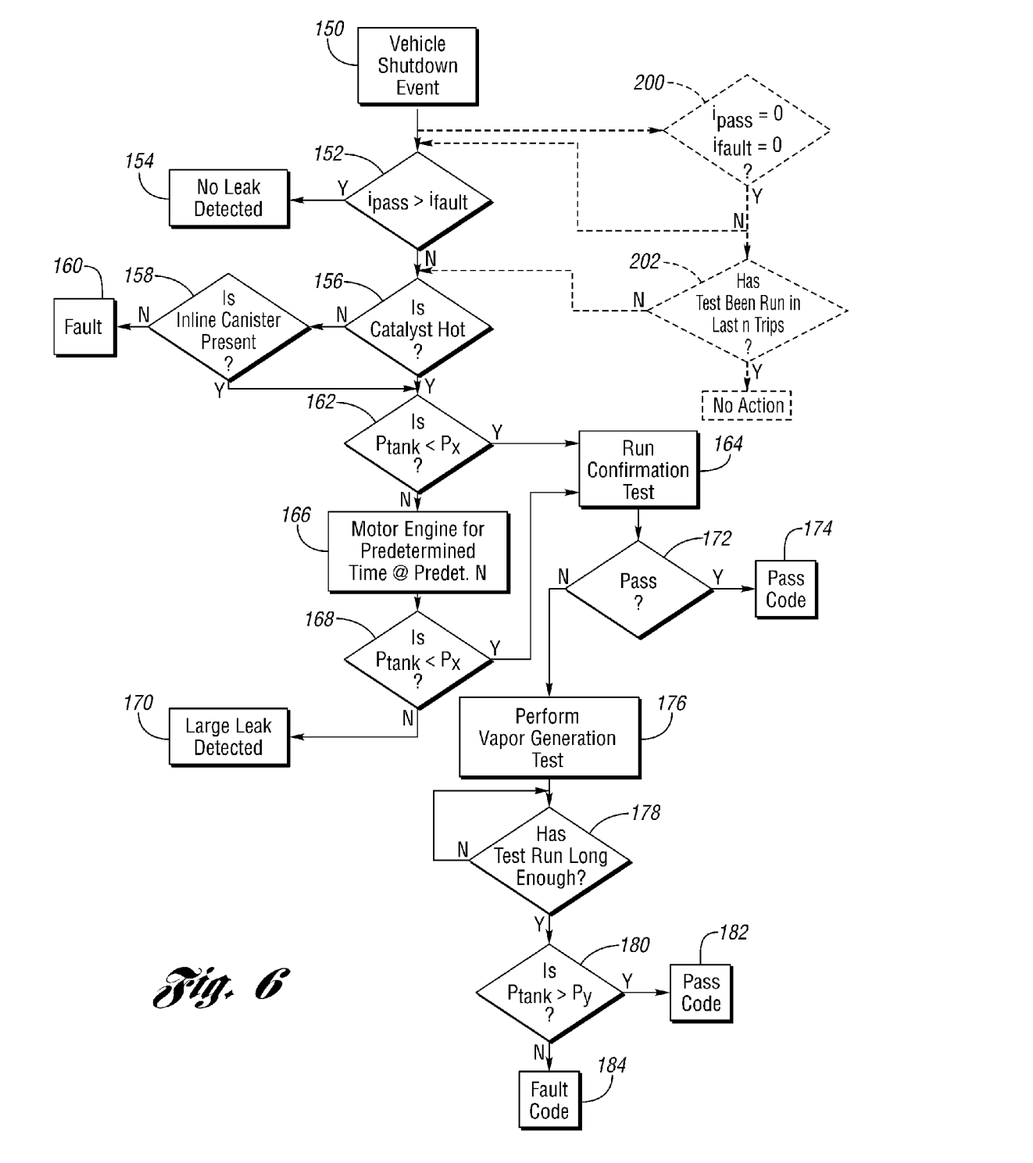
FIG. 6 is a flowchart illustrating another algorithm for a test of the VPS according to the disclosure.

When the vehicle is being shutdown, the controller 26 may conduct a confirmation test for leaks in the VPS 11. A flow chart of an embodiment of a confirmation system integrity test at a vehicle shutdown event is shown in FIG. 6. The controller 26 receives a vehicle shutdown request or command at 150. The vehicle shutdown command may be the user placing the vehicle into a park gear, applying the parking brake, turning an ignition key to an off position, opening a driver side door, or the like.

In some embodiments, the controller 26 then proceeds to compare the pass counter 126 to the fault counter 128 at 152 from the opportunistic test of FIG. 5, when the vehicle is equipped to perform such a test. If the pass counter 126 is greater than the fault counter 128, the controller 26 determines that the VPS 11 has no leak per the test requirements at 154, and provides a pass code. If the pass counter 126 is approximately the same as or is less than the fault counter 128, the controller 26 proceeds to a shutdown confirmation test starting at 156. Of course, other comparison metrics may be provided between the pass and fault counters 126, 128 to determine a pass code, such as the pass counter 126 being a predetermined number or percentage higher than the fault counter 128, to provide for uncertainty in the system.

If the controller 26 is not equipped to conduct an opportunistic test using a pass counter 126 and a fault counter 128, the controller 26 proceeds directly from a vehicle shutdown event at 150 to initiating the system integrity test at 156.

As an entry condition for the confirmation test, the controller 26 determines if the catalyst in the catalytic converter for the engine is above a predetermined temperature at 156. If the catalyst is not sufficiently hot, the controller 26 checks for the presence of an inline canister 15 between the engine 20 and the fuel tank 10 at 158. The inline canister 15 absorbs the vapors from the VPS 11, tank 10, or canister 14 that would otherwise pass through the engine 20 when it is being motored in an unfueled state during the confirmation test. If the controller 26 determines that an inline canister 15 is present, the controller 26 proceeds to measuring the pressure in the fuel tank 10 at 162.

Alternatively, the controller 26 goes directly to measuring the pressure in the fuel tank 10 at 162 if the catalyst is above its predetermined temperature. The controller 26 compares the measured pressure in the fuel tank 10 to a predetermined threshold pressure at 162. If the pressure is less than the predetermined threshold, the controller 26 proceeds to perform a system integrity test of the VPS 11 at 164.

If the pressure is approximately equal to or greater than the predetermined threshold, the controller 26 proceeds to 166 to reduce the pressure in the VPS 11 for system integrity testing. The controller 26 closes canister valve 19, and opens the FTIV 31 and purge valve 24. The controller 26 commands the electric machine in communication with the engine 20 to motor the engine 20. The engine 20 is motored without fuel, which causes a low pressure state or vacuum state in the intake manifold 30. This draws a vacuum on the VPS 11, thereby reducing the pressure in the VPS 11 and fuel tank 10. The controller 26 may motor the engine 20 for a predetermined time at a predetermined speed or revolutions per minute. Alternatively, the controller 26 may actively monitor the pressure in the VPS 11 using feedback from the transducer 32 to determine when to cease motoring the engine 20. When the controller 26 commands the electric machine to cease motoring the engine 20, the controller 26 also commands the purge valve 24 to close, thereby retaining the low pressure or vacuum state in the VPS 11.

The controller 26 then measures the pressure in the VPS 11 using the transducer 32 and compares the measured pressure to a predetermined threshold pressure at 168. If the pressure is not less than a predetermined value, i.e. the pressure is approximately the same as or is greater than the predetermined pressure threshold, the controller 26 provides a fault code signifying a failed test at 170. A large leak may be present in the VPS 11 in this scenario because the pressure in the system 11 was not reduced by motoring the engine 20 to pull a vacuum on the VPS 11.

If the pressure is less than the predetermined threshold at 168, the controller 26 proceeds to 164 to run a system integrity test on the VPS 11. The canister and purge valves 19, 24 are in closed positions. The controller 26 commands the FTIV 31 open, if it is not already open. The VPS 11 and fuel tank 10 are then in an isolated, low pressure state. The controller 26 monitors the pressure in the VPS 11 using the transducer 32 for a predetermined time to determine if a leak is present at 172. If there is little or no change in the pressure, the controller 26 provides a pass code at 174. If there is sufficient change in the pressure, the controller 26 proceeds to 176. The controller 26 may use test criteria, as discussed below with reference to FIG. 7, to determine a pass or a fault condition.

The controller 26 may conduct a vapor generation test at 176 if a fault resulted from system integrity test 172. The controller 26 commands the FTIV 31 and the canister valve 19 to open to vent the VPS 11 and fuel tank 10 to atmospheric pressure. The controller 26 then closes the canister valve 19 and purge valve 24 to isolate the VPS 11 and fuel tank 10 at atmospheric pressure. The FTIV 31 is left open.

The controller 26 monitors the pressure in the VPS 11 and fuel tank 10 for a predetermined length of time at 178. The controller 26 then compares the pressure in the VPS 11 to the atmospheric pressure at 180. In a substantially leak free system, a portion of the fuel in the fuel tank 10 vaporizes during the predetermined length of time at 178, causing the overall pressure in the VPS 11 to increase due to the addition of the partial pressure of the vaporized fuel to the pressure in the VPS 11.

If the pressure in the VPS 11 is greater than the atmospheric pressure, the controller provides a pass code at 182. If the pressure in the VPS 11 is substantially equal to or less than the atmospheric pressure, the controller 26 provides a fault code at 184.

Another subroutine of the confirmation test is shown in phantom in FIG. 6 for use with a vehicle, such as a plug-in hybrid electric vehicle (PHEV), where the engine may not operate every time the vehicle operates. When the engine is not used during a vehicle operation cycle, a determination is made as to whether a system integrity test may not need to be performed for that cycle.

The controller 26 determines if the pass counter 126 and fault counter 128 are both zero at 200 (in phantom) after receiving a vehicle shutdown indication at 150. If the pass and fault counters 126, 128 are both zero, an opportunistic test was not conducted during the current vehicle operation cycle, since the counters 126, 128 are set to zero at vehicle start up. The controller 26 then determines if a system integrity test was conducted during the past n trips or n vehicle operations at 202 (in phantom), where n is a predetermined integer, such as two, three, four, or more.

If a system integrity test was conducted within the past n trips, the controller 26 takes no further action for testing at 204 (in phantom), or alternatively, takes no action if the previous test result was a pass code.

If a system integrity test was not conducted within the past n trips, the controller 26 proceeds to 156 to the entry conditions for a confirmation test for the vehicle.

The controller 26 may have various test criteria to determine is a pass or fault of the test. The controller determines whether a leak is present in the VPS 11 by comparing a measured pressure to a predetermined pressure threshold or value, or alternatively, by comparing a measured vacuum to a predetermined vacuum threshold or value, such as shown in FIGS. 5 and 6 at 124 and 164 respectively.

Figure 7:
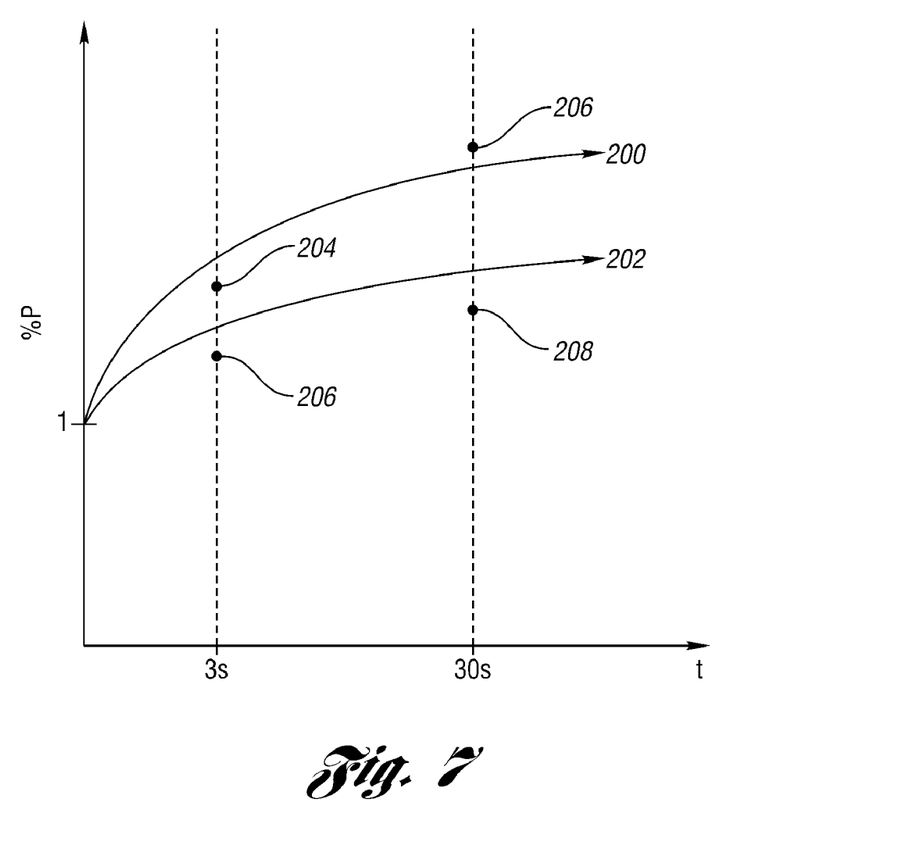
FIG. 7 is a chart illustrating an example of a system integrity test criteria for the VPS according to the disclosure.

In some embodiments, the controller 26 may use a percentage bleed up of the pressure to determine if a leak is present, as shown in FIG. 7. When the VPS 11 is isolated the controller 26 measures the pressure in the VPS 11 when the system is initially isolated to determine an initial pressure, or reference pressure. The controller 26 then continues to monitor the pressure within the isolated VPS 11 for a predetermined length of time. The controller 26 determines if a test was a pass or a fault based on whether the pressure in the VPS 11 bled up more than a threshold amount within the predetermined time.

The initial starting pressure in the VPS 11 may vary, as the same vacuum or low pressure state may not be available from the intake manifold 30 for every test. Hence, there may also be a varying leak threshold which is based on the reference pressure. The use of pressure bleed up within the VPS 11 allows for variability in the initial starting reference pressure.

The controller 26 may have a database or look-up table of pressure decay profiles or percent pressure decay profiles for various reference pressures based on calibrated tests. The controller 26 calculates a percent pressure in the VPS 11 during the test by dividing the real-time measured pressure by the reference pressure to calculate a percent pressure. The controller then compares the percent pressure to the corresponding profile at a given time in the test to determine if a leak is present. If the measured percent pressure is less than the percent threshold at a given time, a leak is present in the VPS.

FIG. 7 is a chart illustrating percent pressure threshold profiles plotted for percent pressure versus time. A first pressure threshold 200 is shown for use with a first reference pressure. A second pressure threshold 202 is shown for use with a second reference pressure. The first reference pressure is higher than the second reference pressure.

The controller 26 measures the reference pressure in the VPS 11 and determines which threshold or profile to use based on the reference pressure. In one example, the controller 26 measures the initial reference pressure and indicates that the first threshold 200 will be used in the system integrity test. The controller 26 monitors the pressure at various times during the predetermined time period and calculates a percent pressure for each pressure measurement for comparison with the threshold. At three seconds into a thirty second test, the controller 26 measures the pressure and calculates a percent pressure at 204, which is below the threshold value shown by line 200, and is a pass at that point. The controller 26 continues to monitor the percent pressure and compare the value to the threshold. Later during the same test, the controller calculates a percent pressure at thirty seconds as shown at point 206, which is above the threshold 200 at that time, which indicates a faulted test. The controller 26 stores a corresponding diagnostic code. If at any time during the test, the controller 26 has a percent pressure below the threshold at a given time, the controller may provide an associated diagnostic code, as the test indicates that the VPS 11 is not holding pressure sufficiently to pass the test criteria.

In another example, the controller 26 measures a lower initial reference pressure, and another percent reference profile 202 is used. At three seconds into a thirty second test, the controller measures the pressure and calculates a percent pressure at 206, which is below the threshold value shown by line 202, and is a pass at that point. The controller 26 continues to monitor the percent pressure and compare the value to the threshold 202. Later during the same test, the controller 26 calculates a percent pressure at thirty seconds as shown at point 208, which is also below the threshold 202 at that time, which indicates a passed test. The measured percent pressure did not rise above or cross the threshold 202 for this test, and the controller 26 indicates a pass code.

Of course, the controller 26 may use a vacuum bleedup threshold profile, a set pressure delta, or any other technique as is known in the art to determine if a leak is present in the VPS 11.

Various embodiments according to the present disclosure have associated advantages. The electric machine may be used to motor an unfueled engine to provide a vacuum source to reduce the pressure in the VPS for a system integrity test. This eliminates the need for a vacuum pump for use with the VPS for a test, thereby reducing the number or parts, cost, and complexity of the system. Also, by motoring the engine using the electric machine, the time the engine is operated in a fueled state is reduced, thereby increasing fuel economy for the vehicle and reducing emissions.

Additionally, a fueled operating engine may be used to provide a vacuum source for the VPS while the vehicle is operating. Low pressure provided by the intake manifold may be stored in the fuel tank in preparation for a test. The use of the engine intake manifold as a source for low pressure or vacuum eliminates the need for a vacuum pump for testing the VPS, thereby reducing the number or parts, cost, and complexity of the system.

Performing the system integrity test using stored low pressure in the fuel tank while the engine is not operating provides additional time to purge the carbon canister during engine operation, since that time is not being used for the testing. In a hybrid vehicle, opportunities for purging the canister is limited compared to a conventional vehicle because the engine may not be operated continuously.

Running multiple system integrity tests during vehicle operation increases the quality of the measurement and the statistical certainty of the outcome of the test. The use of a percent threshold to determine a leak allows for greater variability in the starting pressure within the VPS for the test, since the low pressure or vacuum provided by the intake manifold may not be a constant value.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A method to test a vapor purge system (VPS) for an internal combustion engine in a hybrid vehicle, the method comprising:
    measuring a pressure in the VPS;
    closing a first valve coupling a carbon canister of the VPS and atmosphere;
    decreasing pressure in the VPS if the pressure is greater than a threshold, the pressure decreased by:
        opening a second valve coupling the fuel tank and the engine while the engine is running; and
        closing the second valve when the pressure is below the threshold to provide a variable starting pressure in the VPS related to a manifold pressure for the engine; and
    monitoring pressure in the VPS for a predetermined time period to test for system integrity when the engine is at rest and the vehicle is operating.

2. The method of claim 1 further comprising monitoring pressure in the VPS a plurality of times at corresponding variable starting pressures to improve statistical certainty, the pressure monitored each time for a predetermined time period to test for system integrity when the engine is at rest and while the vehicle is operating.

3. The method of claim 2 further comprising:
    incrementing a pass counter when the pressure remains below a threshold during the predetermined time; and
    incrementing a fault counter when the pressure crosses the threshold during the predetermined time.

4. The method of claim 3 further comprising establishing system integrity in the vapor purge system when the pass counter is greater than the fault counter at a vehicle shutdown event.

5. The method of claim 3 further comprising generating a diagnostic code for the VPS when the pass counter is less than the fault counter at a vehicle shutdown event.

6. The method of claim 5 further comprising performing a secondary pressure test on the VPS in response to the diagnostic code.

7. The method of claim 3 further comprising generating a diagnostic code for the VPS when the pass counter is approximately equal to the fault counter at a vehicle shutdown event.

8. The method of claim 3 further comprising resetting the pass counter and the fault counter at a vehicle startup event.

9. The method of claim 1 further comprising satisfying a set of entry conditions to open the second valve, wherein the entry conditions include an engine manifold pressure being less than a threshold, a temperature in a catalyst coupled to an engine exhaust exceeding a predetermined temperature, and a fill fraction of the carbon canister being less than a predetermined fill fraction.

10. A hybrid electric vehicle (HEV) comprising:
    an engine;
    an electric machine;
    a vapor purge system (VPS) with a pressure transducer and a carbon canister coupled to atmosphere via a first valve and coupled to the engine via a second valve; and
    a controller configured to (i) close the first valve, (ii) close the second valve when the pressure in the VPS is less than a predetermined threshold value to provide a variable starting pressure, and (iii) monitor pressure in the VPS using the pressure transducer while the vehicle is operating and the engine is at rest.

11. The HEV of claim 10 wherein the controller is configured to (iv) open the second valve while the engine is running and the pressure in the VPS is greater than a threshold thereby decreasing the pressure in the VPS, and (v) close the second valve when the pressure in the VPS is less than the threshold and at the variable starting pressure relating to a manifold pressure.

12. The HEV of claim 10 wherein the VPS includes a fuel tank and a third valve for isolating the fuel tank;
    wherein the controller is configured to (iv) close the third valve when the pressure in the fuel tank is less than a threshold to store a vacuum, and (v) open the third valve to use the stored vacuum for monitoring pressure.

13. The HEV of claim 11 wherein the controller is configured to monitor the pressure in the VPS a plurality of times at corresponding variable starting pressures to improve statistical certainty.

14. The HEV of claim 13 wherein the controller has a pass counter and a fault counter, the controller configured to increment the pass counter when the pressure in the VPS remains below a threshold during the predetermined time, and the controller configured to increment the fault counter when the vacuum in the VPS crosses the threshold during the predetermined time.

15. The HEV of claim 14 wherein the controller is configured to establish system integrity in the VPS when the pass counter is greater than the fault counter at a vehicle shutdown event.

16. A method to test a vapor purge system (VPS) for an internal combustion engine comprising:
    closing a first valve coupled between a carbon canister and environment;
    closing a second valve coupled between the canister and the engine to provide a variable starting pressure in the VPS;
    measuring the starting pressure to provide a related reference value having an associated threshold profile that varies with time; and
    monitoring pressure in the VPS compared to the associated threshold profile over a predetermined time period.

17. The method of claim 16 wherein the pressure in the VPS is normalized by the reference pressure value before comparison with the threshold profile.

18. The method of claim 17 further comprising generating a diagnostic code if the normalized pressure in the VPS crosses the threshold during the predetermined time period.

19. The method of claim 16 wherein the threshold profile is defined in terms of a percent pressure and increases with time.

20. The method of claim 1 wherein the pressure is monitored in the VPS for a predetermined time period to test for system integrity when the engine is at rest and the vehicle is operating by comparing the pressure in the VPS normalized by the variable starting pressure to an associated threshold profile that increases with time and is dependent on the variable starting pressure.

* * * * *